United States Patent
Chen et al.

(10) Patent No.: US 8,495,307 B2
(45) Date of Patent: Jul. 23, 2013

(54) TARGET MEMORY HIERARCHY SPECIFICATION IN A MULTI-CORE COMPUTER PROCESSING SYSTEM

(75) Inventors: Tong Chen, Yorktown Heights, NY (US); Yaoqing Gao, North York (CA); Kevin K. O'Brien, South Salem, NY (US); Zehra N. Sura, Yorktown Heights, NY (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 12/777,603

(22) Filed: May 11, 2010

(65) Prior Publication Data

US 2011/0283067 A1    Nov. 17, 2011

(51) Int. Cl.
    *G06F 12/00* (2006.01)
(52) U.S. Cl.
    USPC .......................................... 711/137
(58) Field of Classification Search
    USPC .................. 711/137, E12.001, E12.057
    See application file for complete search history.

(56) References Cited

U.S. PATENT DOCUMENTS

| | | | |
|---|---|---|---|
| 7,353,363 B2 | 4/2008 | Chaudhry et al. | |
| 2005/0027941 A1* | 2/2005 | Wang et al. | 711/121 |
| 2005/0071572 A1* | 3/2005 | Nakashima et al. | 711/137 |
| 2006/0224831 A1* | 10/2006 | Yoshikawa | 711/137 |
| 2008/0195847 A1 | 8/2008 | Wu et al. | |
| 2008/0244232 A1 | 10/2008 | Sherman et al. | |
| 2008/0263279 A1* | 10/2008 | Ramani et al. | 711/119 |
| 2011/0231612 A1* | 9/2011 | Karlsson et al. | 711/119 |

FOREIGN PATENT DOCUMENTS

WO    WO2009/076324 A2    6/2009

OTHER PUBLICATIONS

Barreh et al.; "Method to Dispatch Instructions Off a Target Buffer"; IP.COM-IBM TDB n1, p. 140; Jan. 1, 1993.
Ren et al.; "A Tuning Framework for Software-Managed Memory Hierarchies"; ACM Digital Library; pp. 280-291; Oct. 25-29, 2008.

* cited by examiner

*Primary Examiner* — Kaushikkumar Patel
(74) *Attorney, Agent, or Firm* — Cantor Colburn LLP; William Stock

(57) ABSTRACT

Target memory hierarchy specification in a multi-core computer processing system is provided including a system for implementing prefetch instructions. The system includes a first core processor, a dedicated cache corresponding to the first core processor, and a second core processor. The second core processor includes instructions for executing a prefetch instruction that specifies a memory location and the dedicated local cache corresponding to the first core processor. Executing the prefetch instruction includes retrieving data from the memory location and storing the retrieved data on the dedicated local cache corresponding to the first core processor.

16 Claims, 5 Drawing Sheets

TARGET MEMORY HIERARCHY SPECIFICATION IN A MULTI-CORE COMPUTER PROCESSING SYSTEM

This invention was made with Government support under HR0011-07-9-0002 awarded by the Defense Advanced Research Projects Agency. The Government has certain rights to this invention.

BACKGROUND

This invention relates generally to processing within a computing environment, and more particularly to a target memory hierarchy specification in a multi-core computer processing system.

Prefetch instructions enable a processor to speculatively implement a memory access for a cache line, whereby the cache line is brought into a cache before it is requested by the processor. In this manner, prefetching provides a way to minimize latencies associated with accessing memory by moving the needed data to a closer location in the memory hierarchy before it is needed.

Traditionally, prefetch instructions are issued only by the processor that will consume the prefetched data. Therefore, the location in the memory hierarchy to which the data should be prefetched is assumed to have affinity with the processor from which the prefetch instruction is issued. In a multi-core processing environment, a prefetch instruction issued by one of the cores will load the prefetched data into the cache of the requesting core; however, in some instances a prefetch request for data needed by one of the cores may be initiated by another core. In these situations the efficiency of the prefetch command is reduced because the data is stored in the local cache of the requesting core rather than the local cache of the core that needs the data.

BRIEF SUMMARY

An exemplary embodiment is a system for implementing prefetch instructions. The system includes a first core processor, a dedicated cache corresponding to the first core processor, and a second core processor. The second core processor includes instructions for executing a prefetch instruction that specifies a memory location and the dedicated local cache corresponding to the first core processor. Executing the prefetch instruction includes retrieving data from the memory location and storing the retrieved data on the dedicated local cache corresponding to the first core processor.

An additional exemplary embodiment is a computer-implemented method for implementing prefetch instructions. The method includes issuing a prefetch instruction from a second core of a computer processor. The computer processor includes a first core, the second core, and a dedicated local cache corresponding to the first core. The prefetch instruction includes a request for data stored at an address and a parameter that specifies the dedicated local cache corresponding to the first core. The method also includes retrieving from a memory location of the address and storing the retrieved data on the dedicated local cache corresponding to the first core.

A further exemplary embodiment is a computer program product for implementing prefetch instructions. The computer program product includes a computer-readable storage medium having instructions embodied thereon, which upon execution of the instructions by a computer processor, the computer processor implements a method that includes issuing a prefetch instruction from a second core of a computer processor. The computer processor includes a first core, the second core, and a dedicated local cache corresponding to the first core. The prefetch instruction includes a request for data stored at an address and a parameter that specifies the dedicated local cache corresponding to the first core. The method also includes retrieving from a memory location of the address and storing the retrieved data on the dedicated local cache corresponding to the first core.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
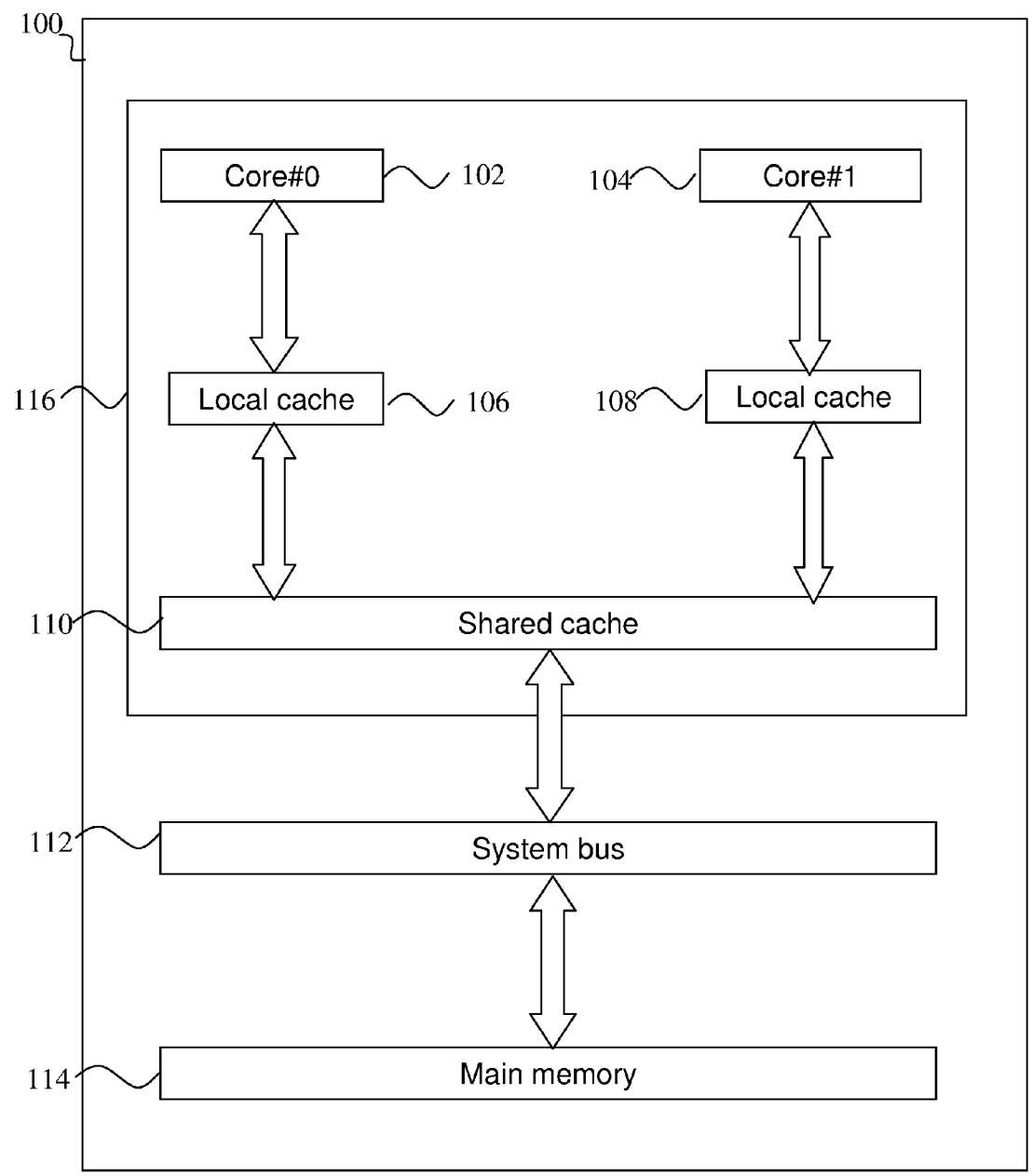
FIG. 1 depicts a block diagram of a multi-core processing system for implementing prefetch instructions having specified target memory hierarchy in accordance with an exemplary embodiment.

Exemplary embodiments of the present invention provide for a target memory hierarchy specification in a multi-core computer processing system. The exemplary embodiments include a prefetch instruction that enables cross-core prefetching and cache storage of data in a multi-core system. A multi-core system refers to a type of computer processing system that includes multiple cores, or individual computer processing units (CPUs), that reside on one or more integrated circuits—either a single integrated circuit die or multiple dies in a single chip package. The integrated circuit having the multiple cores is referred to herein as a "computer processor."

Prefetch instructions issued by computer processors are generally used to speed the access of the processor to data that it will need at some time in the future. The prefetch instruction requests data from memory and stores it in the calling processor's local cache (also referred to herein as "dedicated local cache"). In multi-core multithreaded processing environments, one core may issue a prefetch instruction for another core. However, the data is brought into the memory component closest to the calling core (for example the level 1 (L1) cache of the core issuing the prefetch instruction). In some architectures such as, for example, IBM® POWERS®, a prefetch instruction can specify which level of cache (e.g., L1 or L2), of the issuing core into which the data will be placed. But in the existing architecture, there is no mechanism that allows for a prefetch instruction to specify a target location in the memory hierarchy for multi-core systems. For example, in a multi-core and multi-thread system, helper threads (also referred to as "assist threads") running on simultaneous multithreading (SMT) or chip multiprocessing (CMP) may be used for early address calculation and issuing data prefetch requests. The main thread may benefit from the prefetch issued by the helper thread through a shared cache between the main thread and helper thread. With a traditional prefetch instruction, the data is brought to the helper thread, and the main thread can access the data from the shared cache. Since the data is not in L1 of the core associated with the main thread, the benefits of a prefetch instruction are not fully exploited. In other systems, the latency associated with shared cache access may be still quite high. In still other multi-core systems, the delay incurred when the main thread accesses the shared cache may be even higher, and so the benefit of the prefetch instructions issued by an assist thread may not be fully exploited. Each core may include its own cache (referred to herein as "local cache"). The local cache may be implemented as a single level of memory or as a hierarchical memory system with respect to a corresponding core.

In an exemplary embodiment, the prefetch instruction includes a parameter that specifies the identity of a target core. The target core refers to the individual processor (core) for which prefetched data is requested by a calling core whereby the target core and calling core are not the same core. Thus, when a process thread issues the prefetch instruction, a corresponding cache line is brought into a location in the target core's local cache. As is known in the art, each local cache, or dedicated local cache, corresponds to a core processor and stores prefetch data for use by its corresponding core processor.

Exemplary embodiments of a prefetch instruction, as described herein, may be used in various applications. For example, in a system that provides helper threads (also known as "assist threads"), the prefetch instruction may be employed by the helper thread to specify data to be brought to L1 cache of a main thread and consequently, the main thread is able to retrieve the data quickly from its own L1 cache. In another application, the prefetch instruction may be utilized for synchronization in a producer/consumer model.

Turning now to FIG. 1, a multi-core computer system 100 for implementing prefetch instructions with specified target memory hierarchy will now be described. In an exemplary embodiment, the computer system 100 includes a computer processor 116 having cores 102 and 104. The computer processor 116 may be implemented as an integrated circuit that includes the cores 102 and 104, as well as a shared cache 110. The cores 102 and 104 may be individual CPUs that formed within a single computer processor (e.g., computer processor 116). The cores 102 and 104 process instructions independent of one another, which instructions may include the exemplary prefetch instructions having a specified target memory hierarchy, as described herein. While only a single computer processor 116 and two cores 102 and 104 are illustrated in FIG. 1, it will be understood that any number of computer processors and cores may be implemented in order to realize the advantages of the exemplary embodiments (e.g., cores residing on multiple computer processors, whereby one or more of the computer processors reside on different systems and communicate with one another among these systems, e.g., via a network)

In one exemplary embodiment, the computer system 100 is implemented using a hierarchical system of memory. The hierarchical system includes local caches 106 and 108, the shared cache 110 and a main memory 114. The local caches 106 and 108 may represent a highest level of memory in which the speed of access to data is maximized, e.g., due to the data being stored relatively close to the core. Local cache 106 stores prefetch data for its corresponding core 102, and local cache 108 stores prefetch data for its corresponding core 104. The shared cache 110 may represent a second level of the hierarchy, such that access to data is relatively slower than access to the local caches 106 and 108, but also relatively faster than access to the main memory 114, which represents the lowest level of memory. In one embodiment, the local caches 106 and 108 are level 1 (L1s) caches, the shared cache 110 is a level 2 (L2) cache, and the main memory 114 is a level 3 (L3) cache in the hierarchy.

As shown in FIG. 1, each of the cores 102 and 104 are communicatively coupled to respective local caches 106 and 108. The local caches 106 and 108 may be integrated into the respective cores 102 and 104, or may be external circuits that are accessible to the cores 102 and 104 as is known in the art. The local caches 106 and 108 provide local storage for data and may comprise a single level of cache or may comprise multiple levels of cache, as indicated above. As used herein, the term "dedicated local cache" refers to a local cache that corresponds to a particular core. For example, local cache 106 may be referred to as a dedicated local cache 106 that corresponds to core 102; and local cache 108 may be referred to as a dedicated local cache 108 that corresponds to core 104.

Each of the local caches 106 and 108 is in turn communicatively coupled to the shared cache 110. The shared cache 110 may be integrated into the computer processor 116 (as shown in FIG. 1), or may be an external circuit accessible by the computer system 100. In an exemplary embodiment, the shared cache 110 may be accessible by both of the cores 102 and 104. Although the shared cache 110 is described as a single circuit, the shared cache 110 may be implemented as multiple components each of which is accessible by the local caches 106 and 108. In addition, although the access of the shared cache 110 is described as occurring from the local caches 106 and 108, it will be understood that various threads of the cores 102 and 104 may directly access the shared cache 110.

In an exemplary embodiment, the system 100 also includes a system bus 112. The shared cache 110 may be communicatively coupled to the system bus 112 which, in turn, provides a data path between the computer processor 116 and the other components of the computer system 100, such as the main memory 114 and other computer processors (not shown). Although the shared cache 110 is shown in FIG. 1 as residing between the system bus 112 and the cores 102 and 104, it will be understood that the cores 102 and 104 may be in direct communication with the system bus 112. The main memory 114 stores data for use by the cores 102 and 104. Additionally, the main memory 114 may include storage and controllers (not shown) for processing commands to access memory circuits, and for retrieving data stored in the memory circuits. The main memory 114 may include controllers (not shown) for communicating with the cores 102 and 104, the shared cache 110, and other parts of the system 100. The system bus 112 operates to transfer instructions and data between the main memory 114 and the cores 102 and 104.

As indicated above, a target memory hierarchy specification in a multi-core computer processing system includes a prefetch instruction that enables cross-core prefetching and cache storage of data in the multi-core system. The prefetch instructions may be implemented in hardware, software, or a combination thereof.

Figure 2:
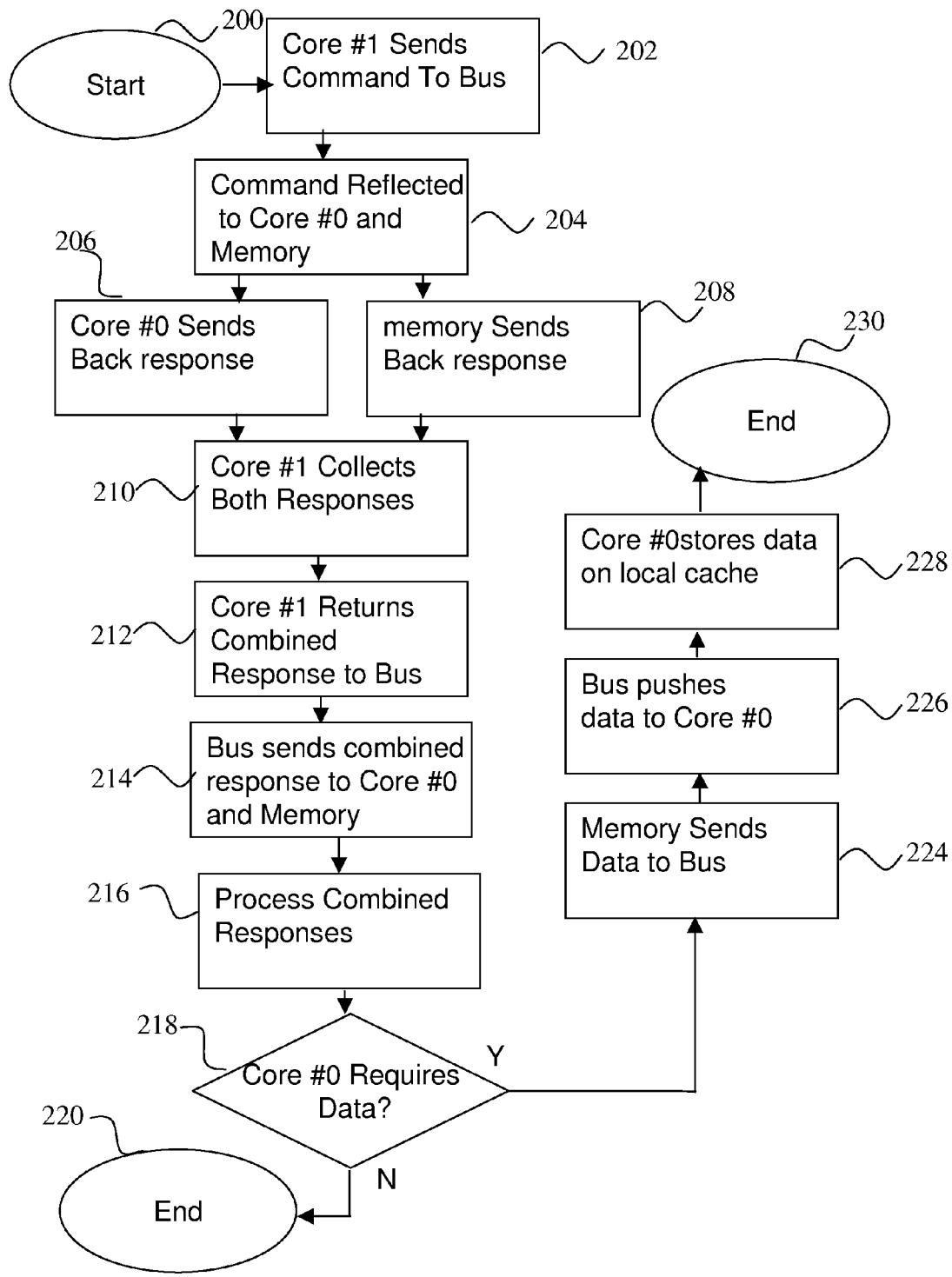
FIG. 2 depicts a flow diagram describing a process for implementing a prefetch instruction with specified target memory hierarchy in accordance with an exemplary embodiment.

Turning now to FIG. 2, a process for implementing a prefetch instruction with specified target memory hierarchy will now be described in an exemplary embodiment. For purposes of illustration, the exemplary embodiment of FIG. 2 is directed to an application in which a helper thread executing on a first core (e.g., core 104) prefetches data for a second core (e.g., core 102). The process begins at block 200, whereby the Core#1 104 sends a prefetch command to the system bus 112 at block 202. At block 204, upon receipt of the prefetch command, the system bus 112 duplicates the prefetch command sending it to both the Core#0 102 and to the main memory 114. At block 206, the Core#0 102 responds to the Core#1 104 indicating whether Core#0 102 still requires access to the data requested in the prefetch request issued by the Core#1 104. The data may not be needed to be prefetched by the Core#0 102 if there is a valid copy of cache line in Core#0's local cache. At block 208, the main memory 114 responds to the Core#1 104 indicating whether or not the main memory 114 is capable of fulfilling the prefetch command. The capability determination may be made based upon various factors. For example, the main memory 114 is capable of fulfilling the prefetch command when the data requested in the prefetch command is determined to be accessible by the memory 114, or if the memory 114 controller (not shown) is able to access the requested memory address. The memory 114 controller may obtain the valid copy of cache line of the required data from a cache from another core in the system (not shown). The conventional cache coherence protocol is assumed to be implemented on the memory 114 controller. The responses (from blocks 206 and 208) may be sent synchronously or sequentially based on the processing load on the Core#0 102 and the main memory 114.

At block 210, the Core#1 104 collects the responses (from blocks 206 and 208) and returns a combined response (i.e., collective responses from the Core#0 102 and the memory 114) and sends the combined response to the system bus 112 at block 212. At block 214, the system bus 112 sends the combined response to both the Core#0 102 and the main memory 114.

At block 216, the combined response is processed by the main memory 114 and the Core#0 102. The processing includes evaluating elements of the combined response to determine a course of action that will be taken. At block 218, the processing includes determining whether the Core#0 102 still requires access to the data requested in the prefetched instruction and whether the main memory 114 is capable of providing the data. If not, the processing ends at block 220. Otherwise, the processing continues at block 224 and the main memory 114 sends the data requested by the Core#1 104 to the system bus 112. At block 226, the system bus 112 sends the data to the Core#0 102. At block 228, the Core#0 102 stores the prefetched data in its local cache 106 and the processing ends at block 230.

Figure 3:
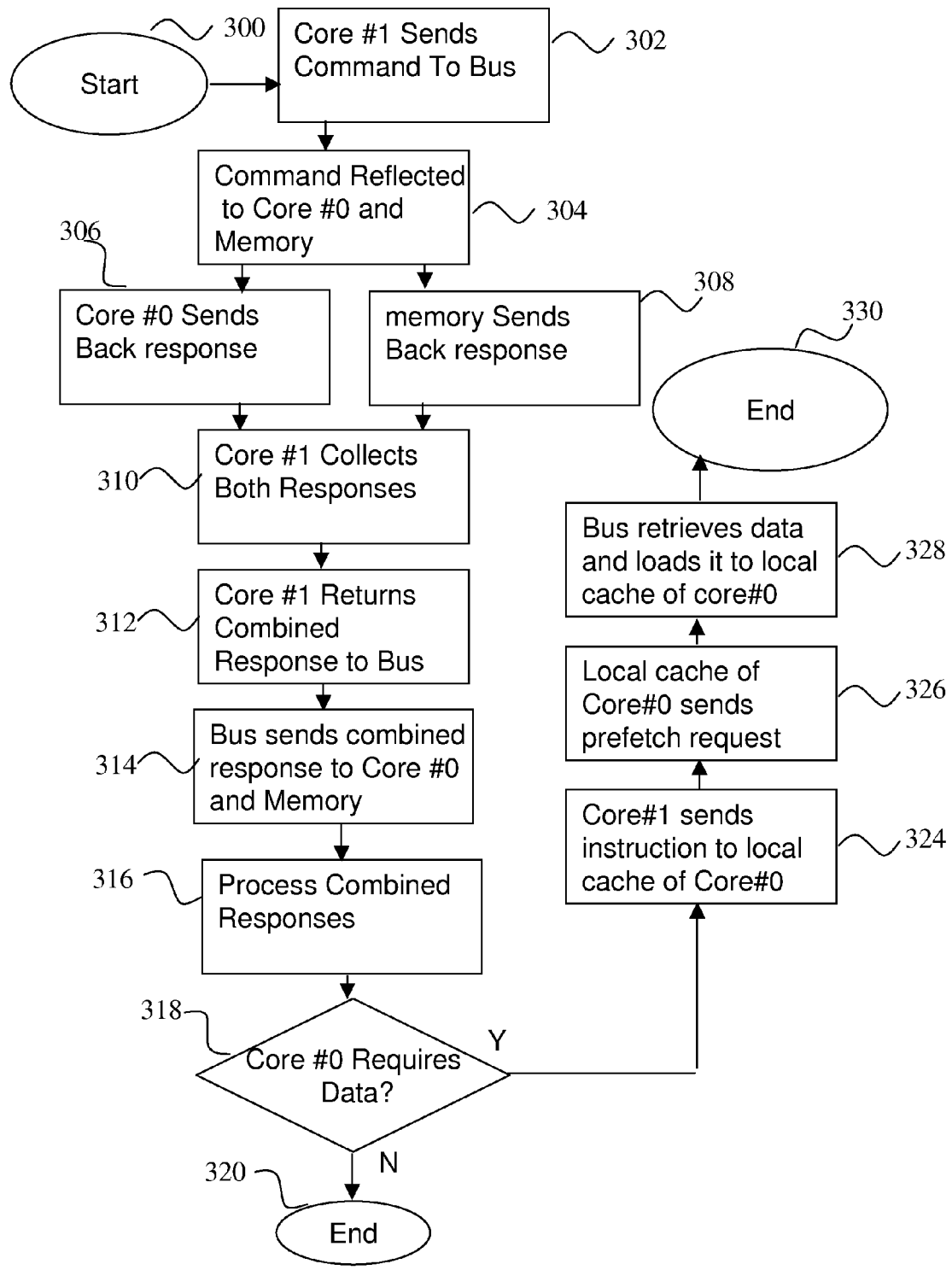
FIG. 3 depicts a flow diagram describing a process for implementing a prefetch instruction with specified target memory hierarchy in accordance with another exemplary embodiment.

Turning now to FIG. 3, a process for implementing a prefetch instruction with specified target memory hierarchy will now be described in another exemplary embodiment. For purposes of illustration, the exemplary embodiment of FIG. 3 is directed to an application in which a first core (e.g., core 104) instructs the local cache (e.g., local cache 106) of a second core (e.g., core 102) to prefetch and load data for the second core 102.

The process begins at block 300, whereby the Core#1 104 sends a prefetch command to the system bus 112 at block 302. At block 304, upon receipt of the prefetch command, the system bus 112 duplicates the prefetch command sending it to both the Core#0 102 and to the main memory 114. At block 306, the Core#0 102 responds to the Core#1 104 indicating whether Core#0 102 still requires access to the data requested in the prefetch request issued by the Core#1 104. The data may not be needed to be prefetched by the Core#0 102 if there is a valid copy of cache line in Core#0's local cache. At block 308, the main memory 114 responds to the Core#1 104 indicating whether or not the main memory 114 is capable of fulfilling the prefetch command. The capability determination may be made based upon various factors. For example, the main memory 114 is capable of fulfilling the prefetch command when the data requested in the prefetch command is determined to be accessible by the memory 114, or if the memory 114 controller (not shown) is able to access the requested memory address. The responses (from blocks 306 and 308) may be sent synchronously or sequentially based on the processing load on the Core#0 102 and the main memory 114.

At block 310, the Core#1 104 collects the responses (from blocks 306 and 308) and returns a combined response (i.e., collective responses from the Core#0 102 and the memory 114) and sends the combined response to the system bus 112 at block 312. At block 314, the system bus 112 sends the combined response to both the Core#0 102 and the main memory 114.

At block 316, the combined response is processed by the main memory 114 and the Core#0 102. The processing includes evaluating elements of the combined response to determine a course of action that will be taken. At block 318, the processing includes determining whether the Core#0 102 still requires access to the data requested in the prefetched instruction and whether the main memory 114 is capable of providing the data. If not, the processing ends at block 320. Otherwise, the processing continues at block 324 and the Core#1 104 sends an instruction to the local cache 106 of the Core#0 102 to start prefetching data from a designated address. At block 326, the local cache 106 of the Core#0 102 sends a load request for data from the address provided at block 324 to the system bus 112. At block 328, the system bus 112 retrieves the data from the requested address and sends it to the local cache 106 of the Core#0 102. In alternate embodiments, the system bus 112 retrieves the data from the main memory 114. In an additional embodiment, the system bus 112 retrieves the data from local cache 108 of the Core#1 104 or the local cache of any of the other processing cores in the computer system 100, and the processing ends at block 330.

Figure 4:
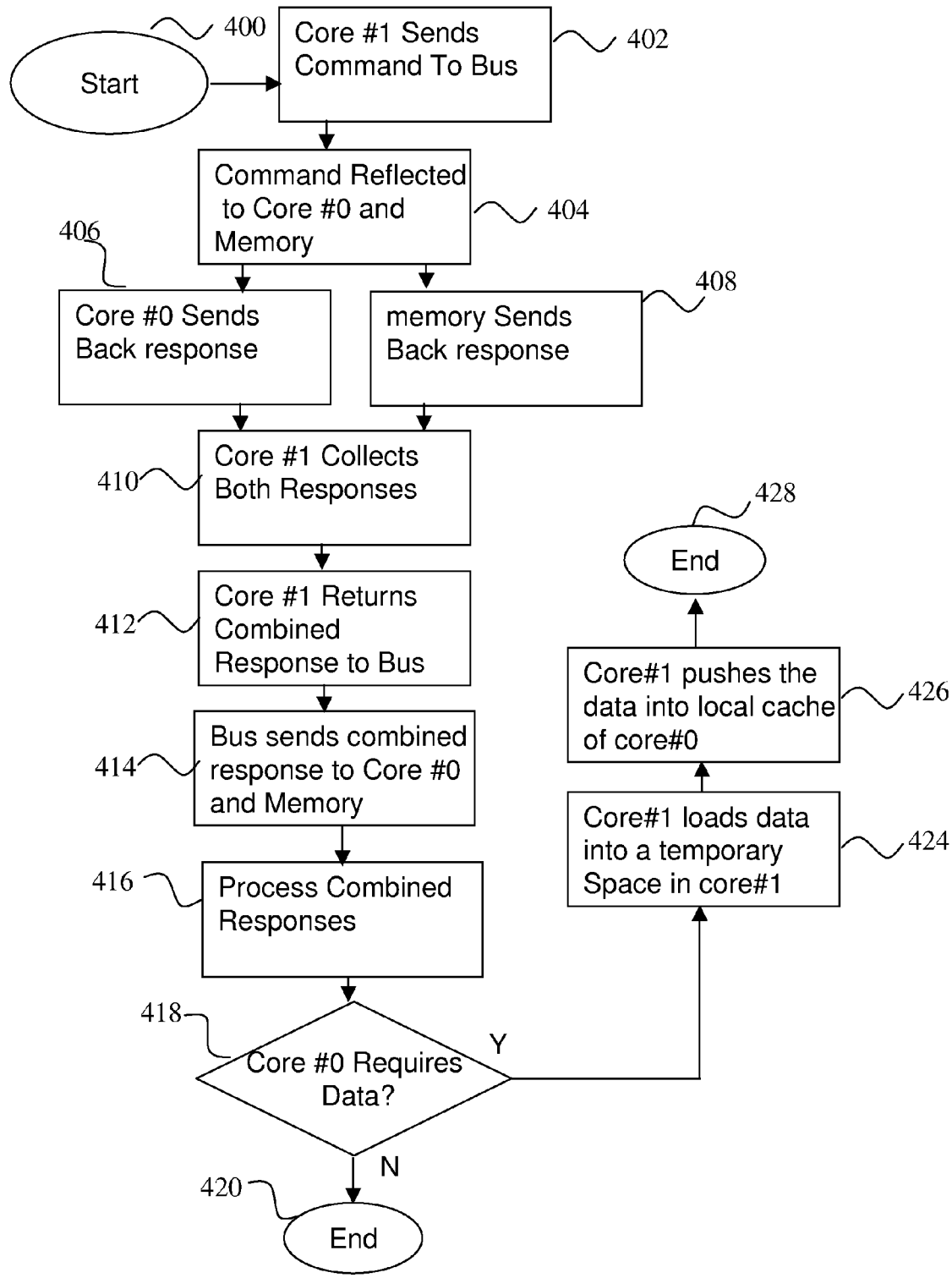
FIG. 4 depicts a flow diagram describing a process for implementing a prefetch instruction with specified target memory hierarchy in accordance with a further exemplary embodiment.

Turning now to FIG. 4, a process for implementing a prefetch instruction with specified target memory hierarchy will now be described in a further exemplary embodiment. For purposes of illustration, the exemplary embodiment of FIG. 4 is directed to an application in which a first core (e.g., core 104) prefetches data for a second core (e.g., core 102) to its local cache (e.g., cache 108) and then pushes the data to a local cache (e.g., cache 106) of the second core (e.g., core 102). The process begins at block 400, whereby the Core#1 104 sends a prefetch command to the system bus 112 at block 402. At block 404, upon receipt of the prefetch command, the system bus 112 duplicates the prefetch command sending it to both the Core#0 102 and to the main memory 114. At block 406, the Core#0 102 responds to the Core#1 104 indicating whether Core#0 102 still requires access to the data requested in the prefetch request issued by the Core#1 104. Data may not be needed to be prefetched by the Core#0 102 if there is a valid copy of cache line in Core#0's local cache. At block 408, the main memory 114 responds to the Core#1 104 indicating whether or not the main memory 114 is capable of fulfilling the prefetch command. The capability determination may be made based upon various factors. For example, the main memory 114 is capable of fulfilling the prefetch command when the data requested in the prefetch command is determined to be accessible by the memory 114, or if the memory 114 controller (not shown) is able to access the requested memory address. The responses (from blocks 406 and 408) may be sent synchronously or sequentially based on the processing load on the Core#0 102 and the main memory 114.

At block 410, the Core#1 104 collects the responses (from blocks 406 and 408) and returns a combined response (i.e., collective responses from the Core#0 102 and the memory 114) and sends the combined response to the system bus 112 at block 412. At block 414, the system bus 112 sends the combined response to both the Core#0 102 and the main memory 114.

At block 416, the combined response is processed by the main memory 114 and the Core#0 102. The processing includes evaluating elements of the combined response to determine a course of action that will be taken. At block 418, the processing includes determining whether the Core#0 102 still requires access to the data requested in the prefetched instruction and whether the main memory 114 is capable of providing the data. If not, the processing ends at block 420. Otherwise, the processing continues at block 424 and the Core#1 104 stores the data in a temporary space in its local cache 108. At block 426, Core#1 104 places the data into the local cache 106 of Core#0 102 and the processing ends at block 428.

Figure 5:
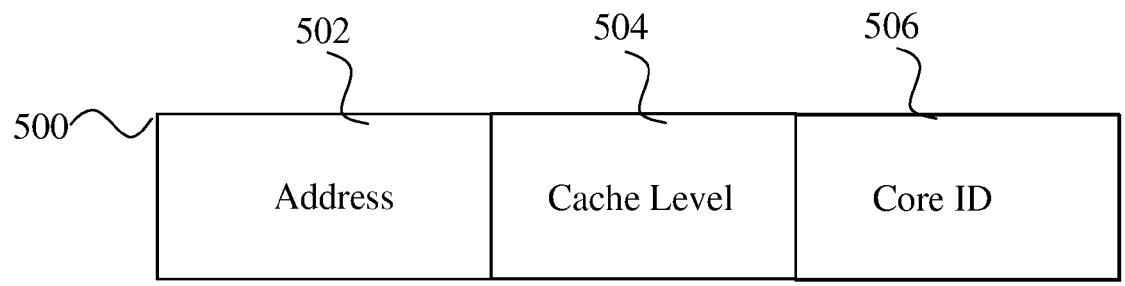
FIG. 5 depicts a block diagram of a prefetch instruction with specified target memory hierarchy in accordance with an exemplary embodiment.

Turning now to FIG. 5, an exemplary embodiment of a portion of a prefetch instruction 500 is displayed. The prefetch instruction 500 includes at least three components: an address parameter 502, a cache level parameter 504, and a core identifier (ID) parameter 506. The prefetch instruction 500 may include additional components such as an op-code. Address bits of the address parameter 502 indicate the address in main memory 114 where the data to be prefetched is located. The cache level bits of the cache level parameter 504 indicate at what level of cache the data should be stored in the local cache 106 of the target core 102. Core ID bits of the core identifier parameter 506 indicate the core for which the prefetched data should be directed. At compile time, a compiler (not shown) may generate a prefetch instruction 500 by analyzing the program being compiled. In exemplary embodiments, the compiler may be configured to identify delinquent loads through static or dynamic profiling. This may be implemented using a profiling tool. For example, a profiling tool may read the performance counters to catch how often cache misses occur at runtime. By further instrumentation in the code, the profiling tool may associate the cache misses with expressions so that delinquent loads can be identified.

In additional exemplary embodiments, the compiler may select candidate code regions, which are memory access intensive and have high cache miss rates, irregular access patterns, complex flow control, or other similar inefficiencies for which data prefetching would be most beneficial. For example, when delinquent loads identified by profiling can not be effectively handled by techniques which insert prefetch within the same thread, a helper thread is generated for prefetch. Loop nests in which delinquent loads are embedded are selected as code regions for helper threads, based on the structure and iteration numbers of the loops.

In further exemplary embodiments, the compiler may outline the candidate code region, and perform backward slicing to execute necessary address calculations. For example, the backward slicing may start from the addresses needed for prefetching, and traverses backward in the data and control dependence graph. If an operation, which is already in the slice, all the data computation needed by this operation, and the branch check which decides whether this operation will be executed or not, are added into the slice. The process continues until no more operations in the code region are added into the slice.

In further exemplary embodiments, the compiler may do cost analysis to determine the level of cache to which the data will be prefetched, and insert the prefetch instruction 500 for use by helper threads (e.g., a thread of core 104). For example, the level of cache is determined by which level the cache misses occur and the cache pressure (e.g., if the delinquent load is dominated by L2 cache misses, the prefetching has to bring data into L2 or L1). Typically, bringing data into L1 rather than L2 provides better system performance; however, sometimes the prefetch may pollute the L1 cache (e.g., analysis reveals that the L1 is already heavily used or several prefetches are speculative).

Although FIG. 5 illustrates components 502, 504, and 506 of the prefetch instruction 500 in a particular order, it will be understood that the prefetch instruction 500 may be configured in any order, and that other parameters and byte segments may be used in addition to those shown in FIG. 5.

Technical effects and benefits include providing faster and more efficient access to data in local cache by a first (primary or main) core using prefetch instructions from a second (secondary or helper) core. The benefits of a prefetch command can be fully realized when the prefetch command is issued from the secondary core, and the data is loaded directly into the local cache of the primary core which is speculated to need the data in the future. Furthermore, the efficient use of a secondary core that has excess processing capacity to make a prefetch request can free the primary core to process instructions without having to make a prefetch command.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In exemplary embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for implementing prefetch instructions, the system comprising:
- a first core processor;
- a dedicated local cache corresponding to the first core processor; and
- a second core processor including instructions for executing a prefetch instruction, the executing comprising:
    - sending, by the second core processor, an instruction to the dedicated local cache corresponding to the first core processor that directs the dedicated local cache corresponding to the first core processor to prefetch data for the first core processor from a memory location;
    - sending, by the dedicated local cache corresponding to the first core processor, a load request for data from the memory location responsive to receiving the instruction from the second core processor;
    - receiving, by the dedicated local cache corresponding to the first core processor, the data corresponding to the load request;
    - storing, on the dedicated local cache corresponding to the first core processor, the received data corresponding to the load request;
    - wherein the executing further comprises: sending, by the second core processor, a command to a system bus;
    - sending, by the system bus, the command to the first core processor and a main memory;
    - receiving, by the second core processor, a first response to the command from the first core processor that indicates that the first core processor requires access to the data that is specified in the command; and
    - receiving, by the second core processor, a second response to the command from the main memory that indicates that the main memory is capable of fulfilling the command,
    - wherein the sending, by the second core processor, of the instruction to the dedicated local cache corresponding to the first core processor is based on receiving the first and second responses.

2. The system of claim 1, further comprising a system bus in communication with the first core processor and the second core processor, wherein the received data is received at the system bus and the storing of the received data on the dedicated local cache corresponding to the first core processor comprises transmitting the data from the system bus to the dedicated local cache corresponding to the first core processor.

3. The system of claim 1, further comprising a system bus in communication with the first core processor and the second core processor, wherein the memory location is in a main memory, the received data is received at the system bus and the storing of the received data on the dedicated local cache corresponding to the first core processor comprises transmitting the data from the system bus to the dedicated local cache corresponding to the first core processor.

4. The system of claim 1, wherein the memory location is in a main memory.

5. The system of claim 1, wherein the memory location is in a second dedicated local cache corresponding to the second core processor.

6. The system of claim 1, wherein the method further comprises:
- re-issuing the instruction from the second core processor in response to determining that the dedicated local cache corresponding to the first core processor is unavailable to receive the retrieved data.

7. A computer implemented method for implementing prefetch instructions, the method comprising:
- sending an instruction from a second core of a computer processor to a dedicated local cache corresponding to a first core of the computer processor that directs the dedicated local cache corresponding to the first core to prefetch data for the first core from a memory location;
- sending, by the dedicated local cache corresponding to the first core, a load request for data from the memory location responsive to receiving the instruction from the second core;
- receiving, by the dedicated local cache corresponding to the first core, the data corresponding to the load request;
- storing, on the dedicated local cache corresponding to the first core, the received data corresponding to the load request;
- wherein the sending the instruction further comprises:
- sending, by the second core, a command to a system bus;
- sending, by the system bus, the command to the first core and a main memory;
- receiving, by the second core, a first response to the command from the first core that indicates that the first core requires access to the data that is specified in the command; and
- receiving, by the second core, a second response to the command from the main memory that indicates that the main memory is capable of fulfilling the command,
- wherein the sending, by the second core, of the instruction to the dedicated local cache corresponding to the first core is based on receiving the first and second responses.

8. The computer implemented method of claim 7, wherein the storing of the received data comprises:
- receiving the data at a system bus that is in communication with the computer processor, the system bus accessible to the computer processor via the second core and the first core; and
- transmitting the data from the system bus to the dedicated local cache corresponding to the first core.

9. The computer implemented method of claim 7, wherein the memory location is in a main memory.

10. The computer implemented method of claim 7, wherein the memory location corresponds to the second core.

11. The computer implemented method of claim 7, further comprising:
- re-issuing the instruction from the second core upon determining that the first core is unavailable to receive the data.

12. A computer program product for implementing prefetch instructions, the computer program product comprising a non-transitory computer-readable storage medium having instructions embodied thereon, which upon execution of the instructions by a computer processor, the computer processor implements a method, the method comprising:
- sending an instruction from a second core of a computer processor to a dedicated local cache corresponding to a first core of the computer processor that directs the dedicated local cache corresponding to the first core to prefetch data for the first core from a memory location;
- sending, by the dedicated local cache corresponding to the first core, a load request for data from the memory location responsive to receiving the instruction from the second core;
- receiving, by the dedicated local cache corresponding to the first core, the data corresponding to the load request;
- storing, on the dedicated local cache corresponding to the first core, the received data corresponding to the load request;

wherein the sending the instruction further comprises:
  sending, by the second core, a command to a system bus;
  sending, by the system bus, the command to the first core and a main memory;
  receiving, by the second core, a first response to the command from the first core that indicates that the first core requires access to the data that is specified in the command; and
  receiving, by the second core, a second response to the command from the main memory that indicates that the main memory is capable of fulfilling the command,
  wherein the sending, by the second core, of the instruction to the dedicated local cache corresponding to the first core is based on receiving the first and second responses.

13. The computer program product of claim 12, wherein the storing of the received data comprises:
  receiving the data at a system bus that is in communication with the computer processor, the system bus accessible to the computer processor via the second core and the first core; and
  transmitting the data from the system bus to the dedicated local cache corresponding to the first core.

14. The computer program product of claim 12, wherein the memory location is in a main memory.

15. The computer program product of claim 12, wherein the memory location corresponds to the second core.

16. The computer program product of claim 12, wherein the method further comprises:
  re-issuing the instruction from the second core upon determining that the first core is unavailable to receive the data.

* * * * *